(12) United States Patent
Huang et al.

(10) Patent No.: US 8,874,061 B2
(45) Date of Patent: Oct. 28, 2014

(54) FILTERING APPARATUS AND METHOD FOR DUAL-BAND SENSING CIRCUIT

(75) Inventors: Chung-Er Huang, Taipei (TW); Huang-Chan Chien, Taipei (TW)

(73) Assignee: Azurewave Technologies, Inc., Taipei (TW)

( * ) Notice: Subject to any disclaimer, the term of this patent is extended or adjusted under 35 U.S.C. 154(b) by 1734 days.

(21) Appl. No.: 12/010,120

(22) Filed: Jan. 22, 2008

(65) Prior Publication Data

US 2009/0096517 A1 Apr. 16, 2009

(30) Foreign Application Priority Data

Oct. 12, 2007 (TW) .............................. 96138190 A

(51) Int. Cl.
*H04B 1/30* (2006.01)
*H04B 1/10* (2006.01)

(52) U.S. Cl.
CPC .................................... *H04B 1/1036* (2013.01)
USPC .......................... 455/307; 455/127.1; 455/296

(58) Field of Classification Search
USPC ............ 455/76, 77, 78, 101, 127.1, 272, 132, 455/135, 255, 260
See application file for complete search history.

(56) References Cited

U.S. PATENT DOCUMENTS

| | | | |
|---|---|---|---|
| 6,400,963 B1 * | 6/2002 | Glockler et al. | 455/553.1 |
| 6,563,396 B2 * | 5/2003 | Tanaka et al. | 333/133 |
| 6,704,378 B2 | 3/2004 | Jagger et al. | |
| 7,773,956 B2 * | 8/2010 | Fukamachi et al. | 455/78 |
| 2006/0229035 A1 * | 10/2006 | Fukamachi et al. | 455/114.1 |
| 2008/0166980 A1 * | 7/2008 | Fukamachi et al. | 455/83 |
| 2008/0212552 A1 * | 9/2008 | Fukamachi et al. | 370/343 |
| 2009/0096517 A1 * | 4/2009 | Huang et al. | 327/556 |

* cited by examiner

*Primary Examiner* — Temesgh Ghebretinsae
*Assistant Examiner* — Richard Chan
(74) *Attorney, Agent, or Firm* — Rosenberg, Klein & Lee

(57) ABSTRACT

A filtering apparatus and method for dual-band sensing circuit are disclosed. The invention features a dual-band sensing unit disposed in a filtering device that receives the signals from a sub-system with variable frequency spectrum. The signals are split up into several bands. After that, one or more frequency detecting units are used to detect the power of high-band and low-band signals, and convert the power into a voltage signal. Users can externally adjust the gain of a tunable gain amplifier for the voltage signal. Further, a comparison operation is processed by a comparator, and a signal resulted from the comparison operation is used to control the switch timing for an RF switching unit. Consequently, this like adaptive notch filter is achieved to determine the intensity of noise and thereby to turn on the high-band or low-band notch filters, so as to reduce the in-band loss.

12 Claims, 6 Drawing Sheets

FILTERING APPARATUS AND METHOD FOR DUAL-BAND SENSING CIRCUIT

BACKGROUND OF THE INVENTION

1. Field of the Invention

The present invention relates to a filtering apparatus and a method for a dual-band sensing circuit, more particularly, a gain of a tunable gain amplifier is externally controlled to determine a switch timing for the notch filters for reducing the interference.

2. Description of Related Art

In general, a high frequency communication module will be designed in accordance with the requirement of the operating frequency spectrum. An RF filter is usually used for filtering the required frequencies. If the required filtered frequency spectrum or energy is higher, the operation order of the filters is higher. Moreover, different requirements of the order are applied to different design variants. The loss of signal strength inside the communication module increases with increasing order of the filters. The larger area of the circuit layout will lengthen the signaling path for the RF element, causing a larger loss in signal strength even though the required energy is supplied.

Moreover, when the conventional high-frequency communication module is designed to be co-existed with variable-frequency subsystems, such as the wireless local area network WiMAX, GSM or 3G communication module cooperates with the subsystems in the frequencies 1.8 GHz and 5 GHz, whereby a filter with extra transmission zero is usually employed to prevent interference. However, the added transmission zero will increase the circuitry in the communication module, and thus increase the in-band loss.

While the simultaneous operation of the variant-frequency subsystems will cause interference, this interference won't have too much effect on the whole system. The variable-frequency subsystems don't operate at the same time as above mentioned, but operate alternately. Thus, the general RF filter does not require too much flexibility to handle filtering of the subsystem signals.

In particular, an adaptive notch filter is used for this wireless communication technology. Since the adaptive notch filter is disposed on an RF signaling path, the bandwidth of the filter is simply controlled to filter a specific frequency band and to respond to a required signal, so as to implement an object rather than a common filter.

A common filter operates by either low-pass filtering or high-pass filtering, that is, the filter filters out the higher frequency segment or the lower frequency segment respectively. Nevertheless, the mentioned adaptive notch filter is a special type of filter that can separate the signals into two parts, wherein the lower frequency segment of one part and the higher frequency segment of the other part are filtered out and mixed afterwards.

The technology of the adaptive notch filter used to eliminate the narrowband interference in wideband communication is illustrated in U.S. Pat. No. 6,704,378. The adaptive notch filter selectively filters a received wideband communication signal to eliminate narrowband interference. For determining the presence of narrowband interference, the adaptive notch filter scans various known narrowband channels that lie within the wideband frequency spectrum, thereby finding the interference source by determining the signal strength.

FIG. 1 shows a wireless communication device including an antenna 10 and a low-noise amplifier 12 connected with the antenna 10. Further, the received signals are transmitted to a splitter 14 that is used to split the signals into different signaling paths. Some split signals are transmitted to the adaptive notch filter module 16, and some are transmitted to one narrowband receiver 18. The signals outputted from the adaptive notch filter module 16 are further transmitted to a wideband receiver 19.

The above-mentioned narrowband and wideband indicate two different channels with different frequency spectrums. The signals outputted from every channel are simultaneously transmitted to another system. In this example, the adaptive notch filter 16 can scan every channel to filter the narrowband interference, and couples to another controlling device or other systems such as a network system and telephony system. Moreover, the narrowband receiver 18 can couple with a switch.

SUMMARY OF THE INVENTION

According to the illustration of the conventional art having the applications on different wireless communication bands or the applications among those bands, the filters therein will produce the mentioned drawbacks. Thus, the present invention provides a filtering apparatus and method for dual-band sensing circuit that can enhance the flexibility of the filters and improve performance for each band. Therefore, the switch timing of the high-band notch filters and low-band notch filters can be controlled precisely, so that one of the tunable voltage amplifiers can be tuned to a suitable gain which is used to switch the RF switch of the communication module.

Besides, the adaptive notch filter of the present invention is applied to eliminate the communication signaling interference effectively, the filters can also be used to activate the high-frequency notch or low-frequency notch for switching the RF switch by determining the interference strength. Therefore the provided filters can reduce the in-band loss.

The preferred embodiment of the filtering apparatus for a dual-band sensing circuit of the present invention at least includes a connect port that connects to a communication module with coexisted variable-frequency subsystems. The apparatus further includes a dual-band sensing unit that splits the received signals into high-band, main-band and low-band signals to several sensing paths. The apparatus further includes a frequency detecting unit for detecting the power of the received signals and converting the power to a voltage. The apparatus further includes a tunable gain amplifier for producing a suitable gain by considering the interference and tuning the mentioned voltage. The apparatus includes a comparing unit for processing a comparison operation between the gain-amplified voltage and a reference voltage. So that, the apparatus can precisely control the timing to turn on the notch filters, and effectively filter and suppress the interference.

The preferred embodiment of the filtering method for a dual-band sensing circuit of the present invention includes a first step of receiving signals, especially the signals generated from a variable-frequency subsystem. Then the received signals are split into respective high-band and low-band signals by filtering. Next, the energy of high-band and low-band signals are calculated respectively, and converted to voltage signals. Next, the controlling signals are generated by manual external control, and the tunable gain amplifier is tuned to obtain a suitable gain for gain-amplifying. After that, the method goes to perform a comparison operation by a comparing unit for controlling the timing to turn on or off the switches. The activation timing for the high-band or low-band notch filter is controlled to filter the signals, and the in-band can be prevented consequently. The outputted signals are sent out through antenna at last.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The present invention is illustrated with a preferred embodiment and attached drawings. However, the invention is not intended to be limited thereby.

A notch filter is a filter that filters out the signals in a specific frequency spectrum. An object of the filtering apparatus and method for dual-band sensing circuit of the present invention is to provide an adaptive notch filter that is disposed on an RF signaling path. The high-band or low-band notch filter is activated by determining the current interference strength by the filtering apparatus. After that, the bandwidth of the filter can be simply controlled to filter out a specific band so as to decrease an in-band loss and respond a required signal.

Figure 1:
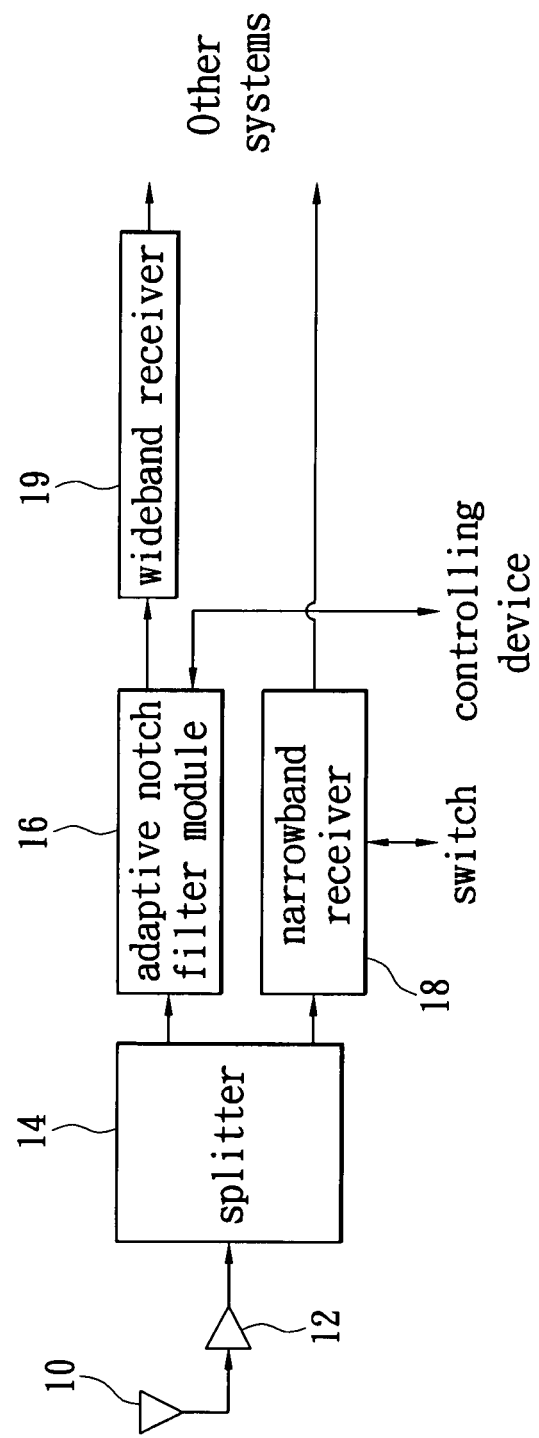
FIG. 1 shows a schematic diagram of a conventional wireless communication device.
Figure 2:
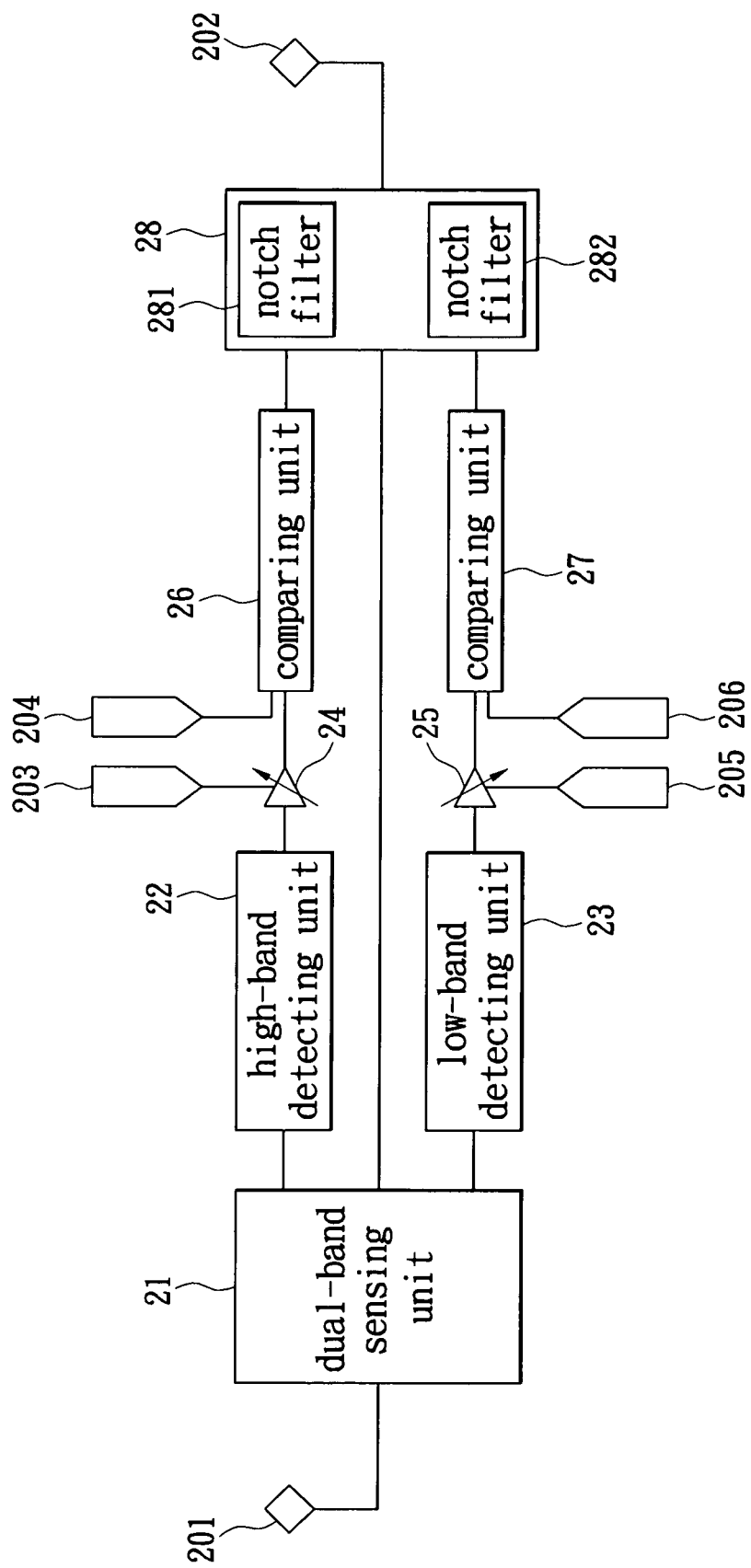
FIG. 2 shows a schematic diagram of the embodiment of the filtering apparatus in a dual-band sensing circuit of the present invention.

Reference is made to FIG. 2, which shows an embodiment of the filtering apparatus for dual-band sensing circuit of the present invention. The filtering apparatus connects to an external signal source through a connect port 201. In the preferred embodiment, the external signal source is implemented as a communication module coexisted with a variable-frequency subsystem. Further, when the signals are transmitted into the filtering apparatus through the connect port 201. Meanwhile, the signals are through a dual-band sensing unit 21 and being split into high and low frequency segments such as high-band, main-band and low-band sensing paths. Since impedance is incorporated, the bandwidth of frequency spectrum can be filtered effectively and controlled easily for eliminating interference.

After split frequency, the high-band signals will pass through a high-band detecting unit 22 capable of high-band detection. The high-band detecting unit 22 couples with the dual-band sensing unit 21, and detects the signaling energy. After that, the detected energy is converted to a voltage and then being transmitted to a tunable gain amplifier 24 coupling to a detecting unit. In the present invention, the tunable gain amplifiers 24 and 25 are disposed in the high-band filtering circuit and low-band filtering circuit respectively. Thus, the way to tune the gain won't amplify the signals of whole system, so that, the main-band signals won't be affected.

The tunable gain amplifier 24 can receive the control signals outside the filtering apparatus. That is, users can enter the control signals via a terminal 203 to adjust the tunable gain amplifier 24 responsive to the interference caused in the apparatus. Next, a suitable amplified voltage is provided in response to a reference voltage. Since every switch has its own characteristics with an activation voltage, the switches in the filtering apparatus can be turned on and turned off by users' configuration. Further, the notch filters 281, 282 can be turned on or turned off correspondingly, and then the required signals are sent out via the connect port 202. Therefore the adaptive notch filters provided by the present invention achieves a customized filtering requirement.

After that, the gain-amplified voltage will be transmitted to a first comparing unit 26. The first comparing unit 26 couples to the tunable gain amplifier 24 and introduces a reference voltage. This comparing unit 26 performs a comparison operation between the voltage and the reference voltage, thereby to determine the switches being turned on or off in the RF switching unit 28. The reference voltage is inputted via a terminal 204 which is configured by the designs of the switches (not shown) in the RF switching unit 28 that couples with the first comparing unit 28. The reference voltage will influence the result from the comparison operation between the reference voltage and the gain-amplified voltage. For example, a signal 1 (on) or 0 (off) is generated by the comparison operation, thereby to control the operation of the switches for precisely controlling the switch timing of activating the high-band or low-band notch filters.

The mentioned RF switching unit 28 at least includes the notch filters 281, 282 applied to high-band or low-band signaling. Each notch filter 281 or 282 can filter out a specific frequency spectrum. Particularly, the switch timing of the notch filters can be controlled by operating with the switches. Thus, the determination of the strength of interference in the apparatus can be used to activate the notch filters for decreasing the in-band loss of whole system.

The low-band filtering circuit is similar to the mentioned high-band filtering circuit. After split frequency by the dual-band sensing unit 21, the low-band signals will be transmitted to a low-band detecting unit 23 capable of detecting low-band signals. The energy of the signals are detected firstly, and being converted to voltage signals. Next, the voltage signals are transmitted to another tunable gain amplifier 25. The tunable gain amplifier 25 can receive a control signal outside the filtering apparatus. The users can also enter the control signal for low frequency filtering via the terminal 205. By means of gain amplifying, the control voltage can be tuned and entered responsive to the interference caused on the apparatus. Since each switch has its own characteristics of activation voltage, a suitable amplified voltage can be provided to compare with the reference voltage.

Moreover, a second comparing unit 27 incorporates a reference voltage via a terminal 206. The reference voltage is configured in response to the characteristics of the switches (not shown) in the RF switching unit 28. The users use the control signal to configure the gain for amplifying. Next, the comparison operation between the reference voltage and gain-amplified voltage is referred to control the switch timing for each switch in the filtering apparatus. Therefore, a customized filtering requirement is achieved by using the adaptive notch filters, and thereby to control the loss of the apparatus.

Figure 3:
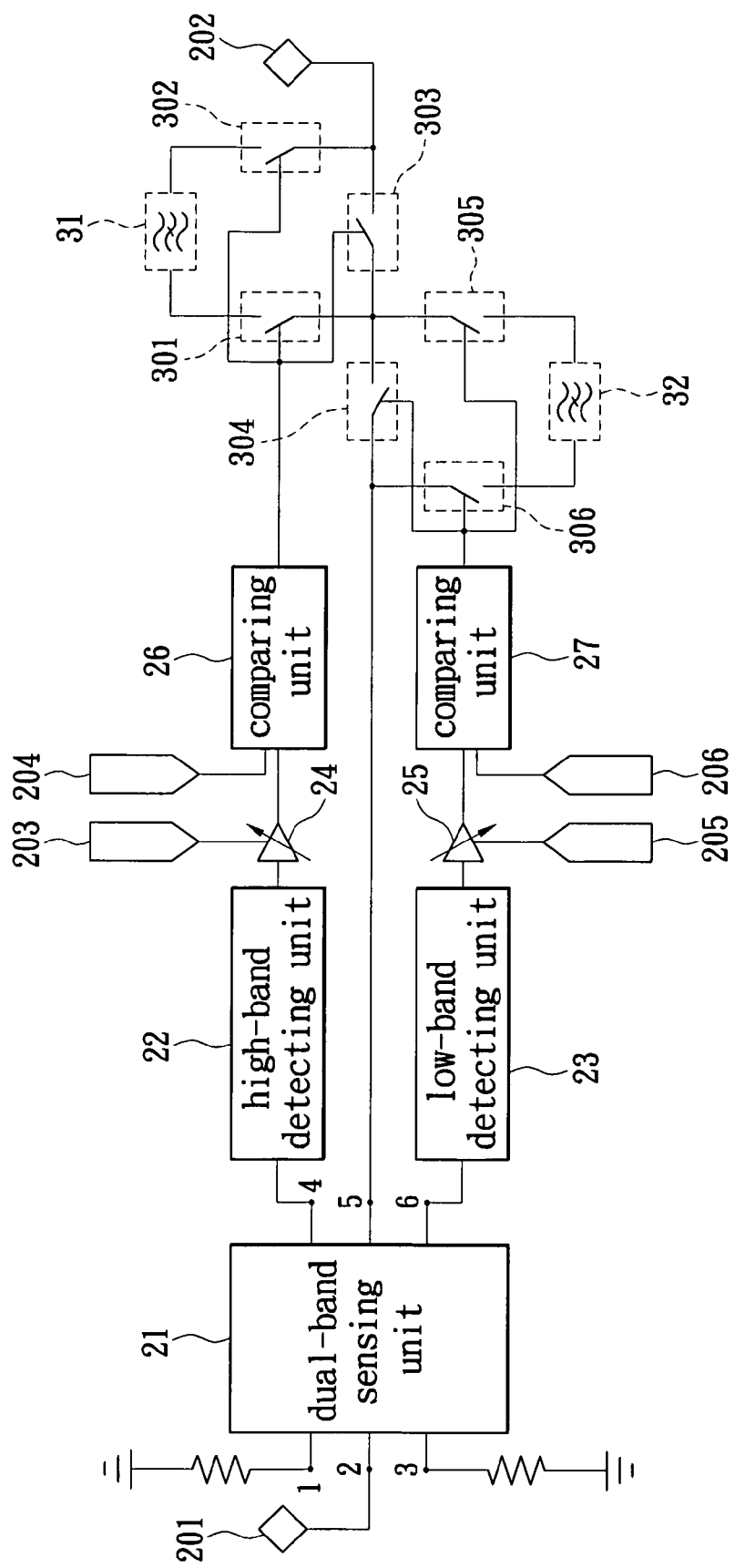
FIG. 3 shows a schematic diagram of the embodiment of the claimed filtering apparatus.

Reference is made to FIG. 3 showing a schematic diagram of the embodiment of the filtering apparatus. In the preferred embodiment, a module coexisted with the variable-frequency subsystems generates signals involving the frequency spectrum 1.8 GHz, 2.4 GHz or 5 GHz in a communication device. The signals can be filtered to generate the signals in variable bands. Meanwhile, the interference among the subsystems with different band should be eliminated. The signals are inputted from an external module via a connect port 201, and being split into variable frequencies through the dual-band sensing unit 21—including high-band, main-band and low-band signals. The useless signals will be filter out by the dual-band sensing unit 21.

Figure 4:
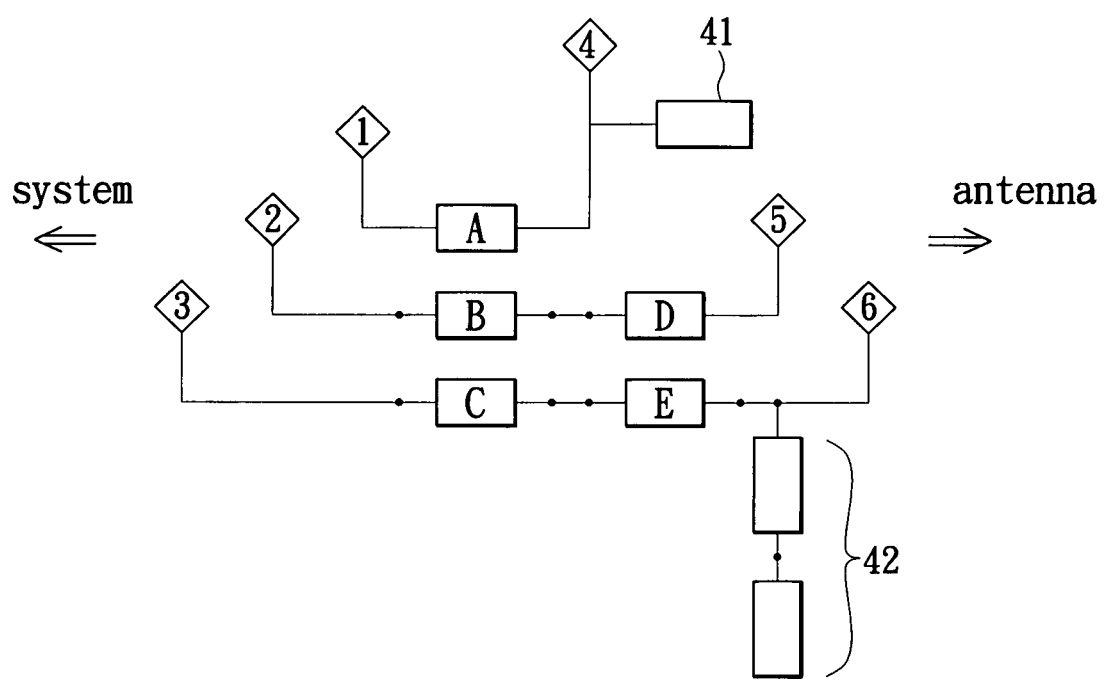
FIG. 4 shows a schematic diagram of the embodiment of the dual-band sensing unit of the present invention.

In the diagram, the dual-band sensing unit 21 has a plurality of connect terminals 1, 2, 3, 4, 5, and 6 which correspond to the connect terminals of the sensing circuit shown in FIG. 4. Particularly, a stepped impedance open stub is used to generate a characteristic with transmission zero which is clarified in the description of FIG. 4.

The signals split by the dual-band sensing unit 21 are transmitted out via the connect terminals 4, 5 and 6. The high-band detecting unit 22 receives the high-band signals via the connect terminal 4, and converts the detected signals into voltage signals. Next, the users can enter control signal via the terminal 203 to the tunable gain amplifier 24. In this exemplary embodiment, a voltage controlled amplifier (VCA) embodies this tunable gain amplifier 24 and the amplifier is a frequency-controlled circuit which controls the voltage for adjusting the gain. Particularly, the users can control the voltage externally for controlling the gain of the amplifier, thereby to adjust the signal with tiny voltage. Next, by means of the first comparing unit 26, a comparison operation is operated with a reference voltage that is inputted via the terminal 204 and being adjusted based on the switches. After the comparison operation by the first comparing unit 26, a control signal 1 as high voltage or 0 as low voltage is generated.

Likewise, a low-band detecting unit 23 converts the low-band signals into the voltage signals via connect terminal 6. The users can send the control signal to the tunable gain amplifier 25 via the terminal 205 for tuning the gain. The amplifier in a preferred embodiment is implemented as a voltage controlled amplifier (VCA). After gain amplifying, the inputted low-band signals is compared with the reference voltage by the second comparing unit 27, so as to generate the control signal with level high or level low voltage for controlling the switches.

After the control signal is generated through high-band signaling circuit and the low-band signaling circuit, the signals will be filtered by the notch filters capable of high-band or low-band filtering. According to the embodiment shown in the diagram, the RF switching unit connected with an antenna is a switching circuit which is implemented as a plurality of switches. The switches have different operating characteristics. For example, a first switch 301 and a second switch 302 coupled with the first comparing unit 26, and a fifth switch 305 and a sixth switch 306 coupled with the second comparing unit 27 are the positive logic RF switches. This kind of positive logic RF switch is turned on as in level high or signal 1, and turned off as in level low or signal 0. Otherwise, a third switch 303 coupled to the first comparing unit 26 and a fourth switch 304 couple to the second comparing unit 27 are the negative logic RF switches. This negative logic RF switch is turned on as in level low or signal 0, and turned off as in level high or signal 1.

Referring to the circuit shown in the figure, the first comparing unit 26 couples to the first switch 301, second switch 302 and third switch 303, and the second comparing unit 27 couples to the fourth switch 304, fifth switch 305 and the sixth switch 306. One object of the present invention is to control the switch timing of the notch filters by means of controlling the switch timing of those switches, and to achieve the adaptive notch filter.

In the beginning of the operation of the filtering apparatus, the users are required to determine a gain in view of requirements of filtering and interference elimination. A control signal responsive to the gain requirement is inputted via the terminals 203 and 205. The switch timing for each switch is controlled according to the comparison operation. After that, the high-band and low-band notch filters are used to filter the frequency spectrum accordingly.

In the current embodiment, when a high-band signal passes through the high-band detecting unit 22, the tunable gain amplifier 24 and the first comparing unit 26, a level high signal or signal 1 is generated to turn on the positive logic RF switches including the first switch 301 and the second switch 302, but to turn off the negative logic RF switch such as the third switch 303. In the meantime, the related circuit in charge of dealing with the low-band signals generates a level low signal or signal 0, that is, the second comparing unit 27 generates the level low signal to turn off the positive logic RF switches including the fifth switch 305 and the sixth switch 306, and turn on the negative logic RF switch such as the fourth switch 304.

Correspondingly, if the inputted control signal is a low-band signal which is a variable frequency of the high-band signal, the upper high-band filtering circuit generates the level low signal or signal 0 that will turn off the positive logic RF switch and turn on the negative logic RF switch. Otherwise, the under low-band filtering circuit generates a level-high signal or signal 1 to turn on the positive logic RF switch and turn off the negative logic RF switch.

According to the above operation, when the input signal is a high-band signal, the generated voltage signal will be used to control the switches. So that, since the signal is transmitted to the high-band notch filter 31 through the first switch 301, the useless frequency spectrum will be filtered out, and the higher frequency spectrum will be kept. Since the second switch 302 is turned on, the high-band signal can be transmitted to the connect port 202, and sent out via an antenna. In particular, since the third switch 303 and the fifth switch 305 are turned off, the signal won't be influenced by other inner circuit.

On the other hand, when the input signal is a low-band signal, the generated voltage signal will turn on the positive logic RF switches including the fifth switch 305 and the sixth switch 306. After that, the useless frequency spectrum will be filtered out as the signal passes through the low-band notch filter 32. In the meantime, the negative logic RF switch such as the third switch 303 connecting to the antenna is turned on and the fourth switch 304 is turned off, so the signal can be sent out via the antenna without any inner interference.

Reference is made to FIG. 4 showing the embodiment of the dual-band sensing unit. There are three paths indicating three mutual coupled circuits with different frequency spectrums other than the conventional two coupled circuits with respective high-band and low-band spectrums. A plurality of connect terminals 1, 2, 3, 4, 5 and 6 shown in the drawing corresponds to the connect terminals 1, 2, 3, 4, 5 and 6 of the dual-band sensing unit 21 shown in FIG. 3. The mentioned three sensing paths has the connect terminals 1 and 4 forming the high-band sensing path, and an open stub 41 (the stepped impedance open stub is for another embodiment) is disposed on the path for filtering some specific spectrums. This high-band sensing path is used to filter out the lower frequency spectrum including the low-band and the main-band parts. The component A indicates a transmission line effect caused on the path.

Furthermore, the circuit between the connect terminals 2 and 5 forms a main-band sensing path. The interference caused by the coupling effect between the circuits should be considered besides considering the transmission line effect indicated as the components B and D.

Still further, the circuit between the connect terminals 3 and 6 forms a low-band sensing path. Besides the transmission line effect shown as components C and E, a stepped impedance open stub is disposed on this path for easily controlling two or more frequencies of two or more transmission zeros, and effectively filtering out the useless frequencies such as main-band and high-band spectrums. Consequently, a tunable transmission zero will be generated; therefore, the filtering apparatus can effectively prevent some unnecessary coupled frequencies by well-controlled position of the transmission zero as designing the apparatus.

Figure 5:
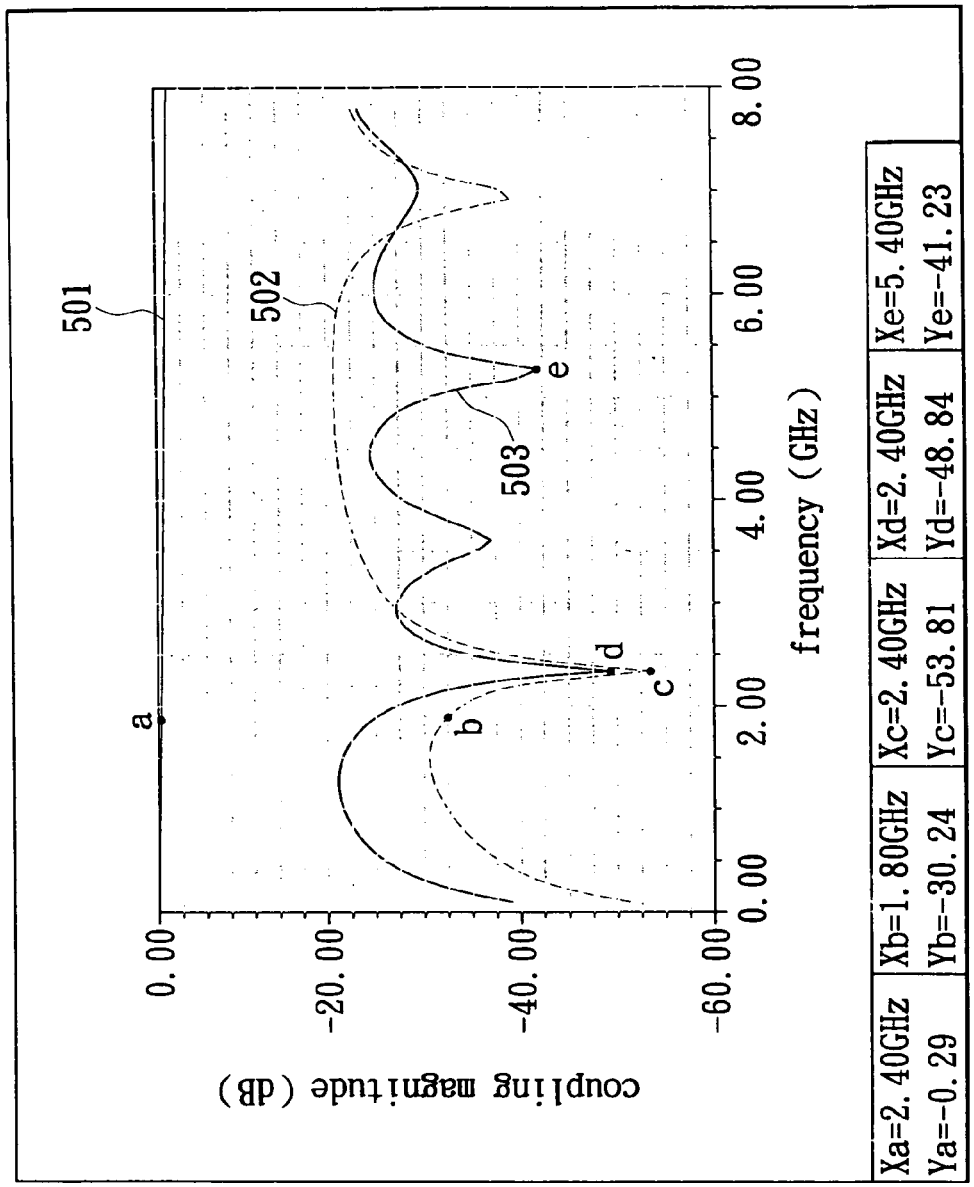
FIG. 5 shows the curves of frequency response of the filtering apparatus of the present invention.

Reference is made to FIG. 5 showing the curves of the frequency response of the filtering apparatus of the dual-band sensing unit shown in FIG. 4. This modular embodiment of the dual-band sensing unit is disposed on the filtering apparatus of the present invention.

There are three curves respectively indicating a main-band coupling curve 501, a high-band coupling curve 502 and a low-band coupling curve 503. Since the tunable gain amplifier is used to adjust a suitable gain through the high-band and low-band filtering circuits, the main-band signals won't be influenced as the curve 501 shows. With the frequency becomes higher, the insertion loss varies slightly. Such as the frequencies marked as the points a, b, c, d and e, the point a indicates frequency Xa=2.40 GHz (such as the frequency spectrum of WLAN) and insertion loss Ya=−0.29.

The curve 502 shows the curve of high-band signals. For filtering the high-band signals, the main-band and low-band signals will be filtered out. The point c shows a transmission zero which is generated by the open stub 41 disposed on the high-band sensing path in FIG. 4. Therefore, the low-band interference is eliminated since the low-band part, such as the point b, is filtered out.

Further, a stepped impedance open stub is disposed on the low-band sensing path, thereby to control two or more frequencies of transmission zeros such as the point d (Xd=2.40 GHz, Yd=−48.84) and point e (Xe=5.40 GHz Ye=−41.23) on the low-band coupling curve 503 in FIG. 5. Based on the requirement, the stepped impedance open stub is adjusted to control two or more positions of the transmission zeros. In the present embodiment, the position of point e can be adjusted in response to high-band interference. In order to determine the frequency spectrum to be filtered out, the distance between the point d and the point e can be adjusted.

Under the analytic result, not only the adaptive notch filter provided by the preset invention can enhance the flexibility of the filtering apparatus, but also to enhance the performance of main-band signaling because the high-band or low-band signals won't affect the main-band signals. Further, the stepped impedance open stub of the dual-band sensing circuit with transmission zero is arranged to control the two or more frequencies of the transmission zeros for preventing unnecessary frequencies to be coupled. Further, the stepped impedance open stub is also used to control the switch timing of the high-band notch filter and the low-band notch filter precisely. In the meantime, the tunable gain amplifier provides a suitable gain for the voltage comparison by a comparator. After that, the RF switching unit is controlled by controlling the switch timing for each switch.

Figure 6:
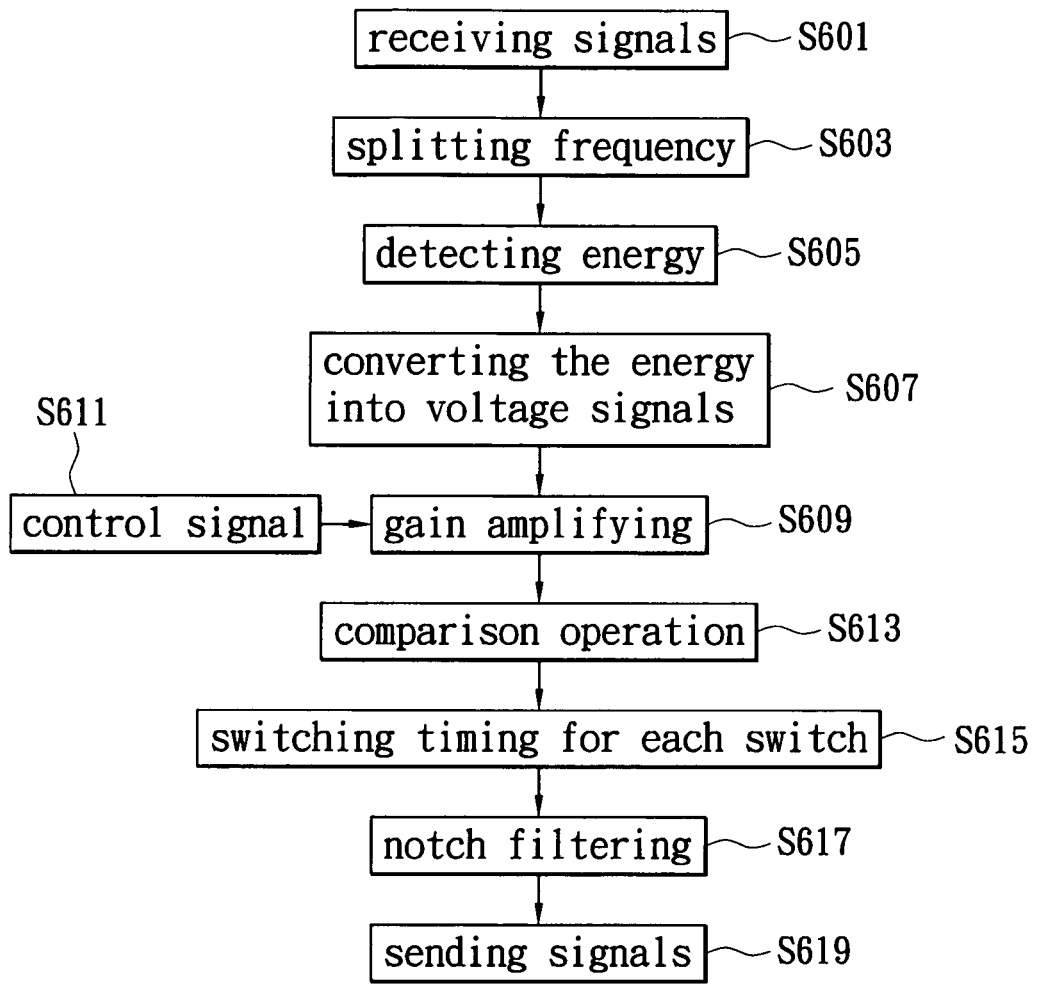
FIG. 6 is a flow chart of the filtering method of the present invention.

FIG. 6 shows a flow chart of the filtering method provided by the mentioned filtering apparatus. In the beginning, the filtering apparatus receives the external signals, especially the signals produced by a variable-frequency subsystem having two or more frequency spectrums (step S601). Next, the dual-band sensing unit performs split frequency to separate the signals into a high-band frequency spectrum and a low-band frequency spectrum. Further, the stepped impedance open stub is arranged with the sensing unit for implementing a tunable filtering (step S603).

After the process of split frequency, the high-band detecting unit detects the energy of the high-band signals (step S605), and converts the energy into voltage signals (step S607). Similarly, the low-band detecting unit detects the energy of the low-band signals, and converts them into voltage signals.

Next, the users can control the high-band and low-band parts externally to generate the control signal (step S611). The control signal is inputted to the tunable gain amplifier for adjusting the gain (step S609). Particularly, the control voltage and the suitable gain are arranged based on the interference caused on each system. Next, the comparison operation between the gain amplified voltage and the reference voltage is operated by a comparing unit (step S613). The switch timing for each switch is controlled responsive to the result of comparison operation (step S615). The embodiment of the switches is shown in FIG. 3.

The switch timing for each switch is determined by the input signal, and further to control the switch timing of the high-band and low-band notch filters precisely. Afterwards, the notch filter goes to process filtering, that is to activate the high-band or low-band filtering by determining the strength of interference, so as to eliminate the in-band loss (step S617). At last, the signals are sent out via antenna (step S619).

If the modular dual-band sensing unit provided by the present invention is incorporated with a common RF-related product, only the gain of the tunable gain amplifier needs to be arranged according to the requirement of product. Since the switch timing for each switch of the RF switch unit is controlled according to the comparison operation, the switch timing of the notch filter is further controlled. By means of controlling the RF switching unit, the interference is eliminated effectively for the coexisted variable-frequency subsystem. Most important thing is to prevent the in-band interference or in-system redundant interference.

While the invention has been described by means of a specification with accompanying drawings of specific embodiments, numerous modifications and variations could be made thereto by those skilled in the art without departing from the scope and spirit of the invention set forth in the claims.

What is claimed is:

1. A filtering apparatus for a dual-band sensing circuit, comprising:
    a dual-band sensing unit having a plurality of connecting terminals connected to a defined high-band sensing route, a defined low-band sensing route and a defined main-band sensing route, all of which are configured to receive signals from a sub-system of frequencies of different frequency ranges through a connect port, with the received signals categorized in accordance with the frequency ranges thereof; and at least one stepped impedance open stub is incorporated into the defined high-band sensing route for filtering out the signals of frequencies outside the first frequency range; a stepped impedance open stub in incorporated into the defined low-band sensing route for controlling two or more frequencies of transmission zeros to filter out the received signals suitable for being transmitted along the defined main-band sensing route and the defined high-band sensing route;

one or more frequency detecting units coupled to the dual-band sensing unit for detecting the received signals that are transmitted along the defined high-band sensing route and the defined low-band sensing route, wherein the frequency detecting unit detects an energy of the received signals before converting the energy to corresponding voltages;

one or more tunable gain amplifiers coupled to the frequency detecting units for receiving the voltages, and receiving an external controlling signal for tuning an amplifying gain of the tunable gain amplifier;

one or more comparing units coupled to the tunable gain amplifiers, wherein the comparing unit introduces a reference voltage and processes a comparison operation between the reference voltage and the amplified voltage; and an RF switching unit coupled to the comparing unit and including a plurality of switches, wherein the RF switching unit receives a signal resulting from the comparison operation to turn on or turn off the switches and controls when to turn on a plurality of built-in notch filters including high-band notch filters and low-band notch filters;

wherein the dual-band sensing categorizes the received signals within the different frequency ranges into the received signals within a first frequency range and the received signals within a second frequency range.

2. The filtering apparatus of claim 1, wherein the dual-band sensing unit categorizes the received signals into the received signals within a first frequency range, a second frequency range, and a third frequency range suitable for being transmitted along the defined high-band sensing route, the defined low-band sensing route, and the defined main-band sensing route, respectively.

3. The filtering apparatus of claim 2, wherein both the defined high-band sensing route and the defined low-band sensing route are equipped with the tunable gain amplifiers.

4. The filtering apparatus of claim 1, wherein the high-band notch filters and low-band notch filters are coupled with a plurality of positive logic RF switches and negative logic RF switches, respectively.

5. The filtering apparatus of claim 1, wherein the high-band notch filters and low-band notch filters are activated depending on operations of the switches if the comparing unit generates a voltage-high signal, and the high-band notch filters and low-band notch filters are deactivated depending on the operations of the switches if the comparing unit generates a voltage-low signal.

6. A filtering apparatus for a dual-band sensing circuit, comprising:

a dual-band sensing unit, which receives signals sent from a sub-system of different frequencies via a connect port, and categorizes the received signals into the received signals within a first frequency range, a second frequency range, and a third frequency range, wherein the received signals categorized into the first frequency range, the second frequency range, and the third frequency range are suitable for being transmitted along a defined high-band sensing route, a defined low-band sensing route and a defined main-band sensing route, respectively, through a plurality of connect terminals; and at least one stepped impedance open stub is incorporated into the defined high-band sensing route for filtering out the signals of frequencies outside the first frequency range; a stepped impedance open stub in incorporated into the defined low-band sensing route for controlling two or more frequencies of transmission zeros to filter out the received signals suitable for being transmitted along the defined main-band sensing route and the defined high-band sensing route;

a high-band detecting unit disposed on the high-band sensing route, and coupled to the dual-band sensing unit through one of the connect terminals, used for detecting the received signals within the first frequency range before the received signals within the first frequency range are converted into first voltage signals;

a low-band detecting unit disposed on the low-band sensing route and coupled to the dual-band sensing unit through one of the connect terminals, used for detecting the received signals within the second frequency range before the received signals within the second frequency range are converted into second voltage signals;

one or more tunable gain amplifiers coupled with the high-band detecting unit and the low-band detecting unit, used for tuning gains for the first voltage signals and the second voltage signals;

one of a plurality of terminals for rendering externally configurable the gains of the tunable gain amplifiers;

one of a plurality of comparing units coupled with the tunable gain amplifier, used to perform a comparison operation between the amplified first voltage signals and the amplified second voltage signals and a reference voltage; and an RF switching unit having a plurality of switches and the high-band notch filters and low-band notch filters, used to turn on or turn off the switches according to a result of the comparison operation, and control when to turn on the high-band notch filters and low-band notch filters.

7. The filtering apparatus of claim 6, wherein the switches include a plurality of positive logic RF switches and negative logic RF switches.

8. The filtering apparatus of claim 6, wherein the high-band notch filters and low-band notch filters are turned on if the comparing unit generates a level-high signal, and the high-band notch filters and low-band notch filters are turned off if the comparing unit generates a level-low signal.

9. A filtering method for a dual-band sensing circuit, comprising:

receiving signals;

performing filtering and frequency splitting through a dual-band sensing unit having a plurality of connecting terminals connected to a defined high-band sensing route, a defined low-band sensing route and a defined main-band sensing route suitable for transmitting the received signals categorized into the received signals within a first frequency range, a second frequency range, and a third frequency range, respectively; wherein at least one open stub or stepped impedance open stub is disposed in the dual-band sensing unit so as to filter out received signals outside of the first frequency range; at least one open stub or stepped impedance open stub is disposed in the dual-band sensing unit, and the open stub is used to control two or more frequencies of transmission zeros for filtering out the received signals suitable for being transmitted along the main-band sensing route and the high-band sensing route;

detecting an energy of the received signals by a high-band detecting unit and a low-band detecting unit;

converting the energy of the received signals into corresponding voltage signals;

tuning a gain for the voltage signals through a tunable gain amplifier, with the gain adjustable by an external control signal;

performing a comparison operation between the amplified voltage signals and a reference voltage by a comparing unit;

generating a signal resulted from the comparing unit used to control timing of turning on a plurality of switches; and controlling whether to turn on the high-band notch filters and low-band notch filters depending on operations of the switches.

10. The filtering method of claim 9, wherein the received signals is generated by a sub-system, and the received signals are of at least two or more frequencies.

11. The filtering method of claim 9, wherein the switches include a plurality of positive logic RF switches and negative logic RF switches.

12. The filtering method of claim 9, wherein the comparing unit generates a level-high or a level-low signal to turn on or turn off the switches.

\* \* \* \* \*